United States Patent [19]

Martinez

[11] Patent Number: 5,529,499

[45] Date of Patent: Jun. 25, 1996

[54] APPARATUS FOR TEACHING SHOE ORIENTATION

[76] Inventor: Thomas Martinez, 5240 Golf Valley Way, Stone Mountain, Ga. 30088

[21] Appl. No.: 513,067

[22] Filed: Aug. 9, 1995

[51] Int. Cl.⁶ .................................................. G09B 19/00
[52] U.S. Cl. ............................................ 434/258; 434/259
[58] Field of Search ...................... 36/112, 136; 40/636;
446/397; 434/500, 258, 252, 259, 238;
273/32 R, 35 R, 183.1, 186.1, 187 R, 187 A,
187 B, 187.2, 188 A

[56] References Cited

U.S. PATENT DOCUMENTS

| 5,244,233 | 9/1993 | McCraneg | 40/636 X |
| 5,269,690 | 12/1993 | Zigon | 434/258 X |
| 5,419,562 | 5/1995 | Cromarly | 434/252 X |

FOREIGN PATENT DOCUMENTS 2544109  10/1984  France .................................. 434/250

Primary Examiner—Richard J. Apley
Assistant Examiner—Glenn E. Richman
Attorney, Agent, or Firm—James B. Middleton

[57] ABSTRACT

A teaching device assists a child in learning to put on shoes correctly by rewarding the child when the shoes are put on correctly. A telescoping enclosure has a movable upper section with footprints on the upper section. The footprints are shaped to conform to right and left shoes, and additional symbols may be applied to the footprints. The child's shoe will have a shorting bar to cooperate with an electric grid on one of the footprints. As a result, when the shoes are on correctly, the shorting bar will engage the electric grid so a circuit will be completed, and entertainment will be provided in the form of light and/or sound play.

5 Claims, 1 Drawing Sheet

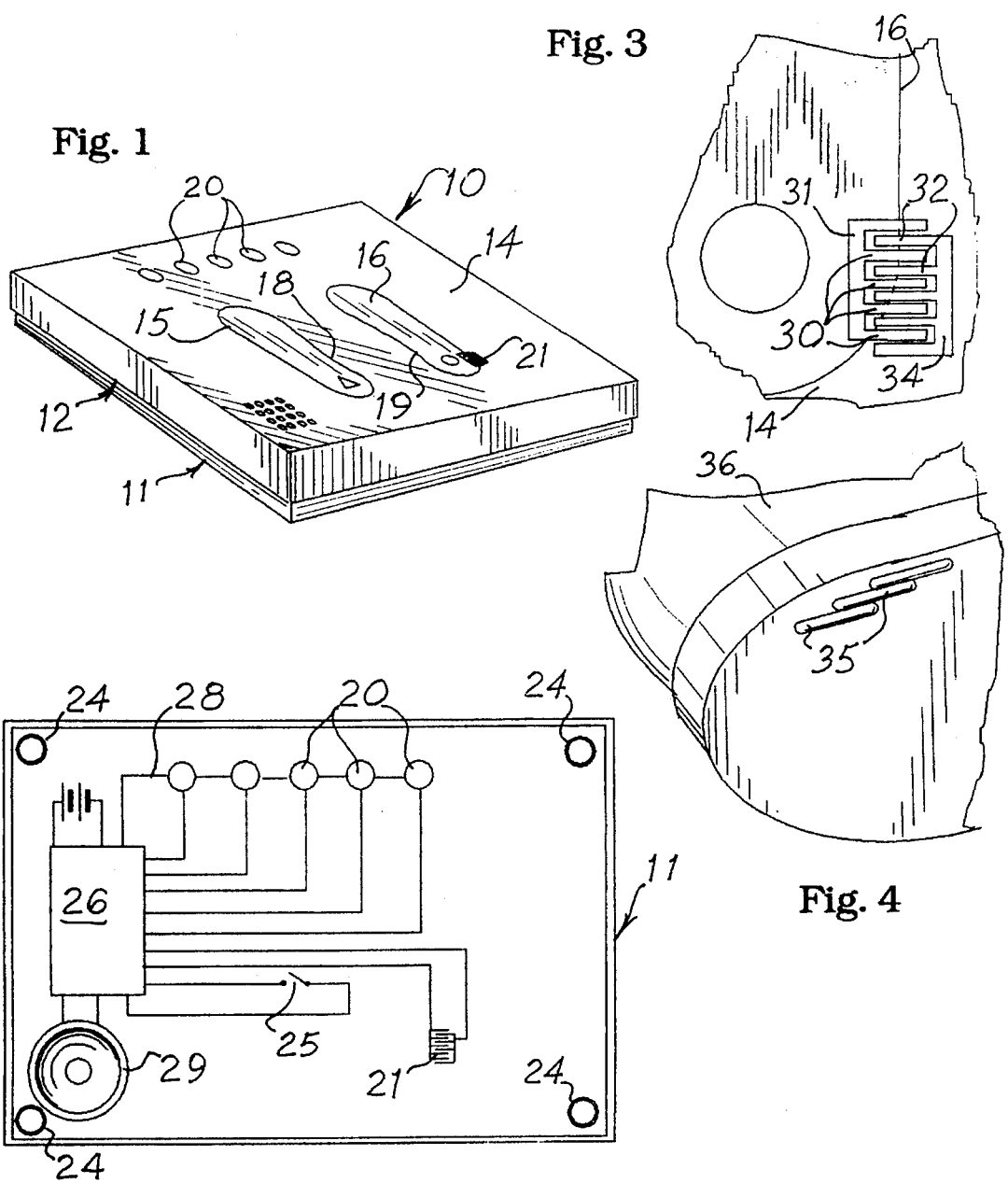

APPARATUS FOR TEACHING SHOE ORIENTATION

BACKGROUND OF THE INVENTION

1. Field of the Invention

This invention relates generally to teaching apparatus, and is more particularly concerned with a device for assisting children in learning proper orientation of right and left shoes.

2. Discussion of the Prior Art

There have been many efforts at devising a system to teach a child how to put on shoes without adult supervision. Most of these systems utilize symbols for indicating left and right shoes, the symbols having some relational aspect so the child will orient the shoes correctly. For example, in U.S. Pat. No. 5,240,418 the symbols must face each other for the shoes to be oriented correctly. U.S. Pat. No. 4,832,606 utilizes pictures forming a "picture story" that requires proper shoe orientation to realize the story; and, U.S. Pat. No. 3,258,858 has half a picture or the like on each shoe so that the shoes must be oriented correctly to complete the picture. All of these depend on having the child learn the symbols. If the child learns the symbols backwards, the shoes will be reversed and the child has no means for detecting the error.

SUMMARY OF THE INVENTION

The present invention provides an apparatus that will inform a child as to whether or not the child has put on his shoes correctly. The device preferably includes symbols that can eventually be learned to inform the child which is left and which is right. During this learning process, however, the device of the present invention informs the child when shoes are oriented correctly, and rewards the child with a play of lights and/or sound.

In the preferred embodiment of the invention, the device includes footprints showing the shape of left and right shoes; and, one of the footprints includes triggering means so that placing the proper shoe on the triggering means will initiate the light or sound play.

BRIEF DESCRIPTION OF THE DRAWINGS

There are other features and advantages of the present invention will become apparent from consideration of the following specification when taken in conjunction with the accompanying drawings in which:

FIG. 1 is a perspective view showing a teaching apparatus made in accordance with the present invention;

FIG. 2 is a top plan view of the apparatus shown in FIG. 1, but with the top removed to show the interior construction;

FIG. 3 is an enlarged, fragmentary view showing the triggering means; and,

FIG. 4 is a fragmentary, detail view showing a portion of a shoe heel having complementary triggering means for cooperating with the device shown in FIG. 3.

DETAILED DESCRIPTION OF THE EMBODIMENT

Referring now more particularly to the drawings and to that embodiment of the invention here chosen by way of illustration, the device shown in FIG. 1 includes a telescoping enclosure 10 having a bottom section 11 with a top section 12 telescoping thereover. The upper surface 14 of the top section 12 has a pair of footprints thereon. The footprints may be painted, applied as decals, or by other means well known in the art. The left footprint 15 is shown as having a triangle therein, and the right footprint 16 is shown as having a circle therein. Any other symbols desired can be used, but these are symbols to be identified with the left and right shoes. The symbols may be meaningless to the child in the beginning, but use of the teaching device of the present invention will assist the child in learning the association.

The footprints 15 and 16 are preferably shaped to suggest the left and right shoes respectively. For example, the adjacent sides of the footprints have inward curvatures as at 18 and 19 to suggest the arch. The child can very quickly learn that the shoes are inwardly curved, and that these are to placed on the similar curves 18 and 19.

The device of the present invention both informs the child when the shoes are oriented correctly or incorrectly, and rewards the child with visual and/or auditory stimulation for the correct orientation. It will be noticed that the enclosure 10 has a plurality of lights 20 adjacent to the toe end of the footprints 15 and 16. There is a triggering means 21 at least partially overlapping the footprint 16; and, when operated by a complementary triggering means on a shoe, the triggering means 21 causes activation of the lights 20. The lights 20 are placed to be visible to a child standing on the surface 14, and the lights may blink, light in various sequences or the like to be entertaining to a child.

If desired, the device of the present invention may have an auditory response when triggered. FIG. 1 illustrates a plurality of openings from which sound may be emitted.

From the foregoing it will be understood that the present invention provides footprints shaped to assist a child in matching the proper shoe with the proper—the right or the left—footprint. Additional symbols may be printed within the footprints, and also in the shoe. When the child correctly puts on shoes, the child will stand on the surface 14 with the feet in the footprints 15 and 16, and the apparatus will be triggered to provide visual an/or auditory entertainment. Thus, the child is rewarded for each correct act. When the shoes are not put on properly, the required complementary triggering means will not be available to trigger the device, and there will be no entertainment.

With attention to FIG. 2 of the drawings, it will be seen that the enclosure 10 contains a plurality of springs 24. The springs 24 are preferably coil springs, fixed to the bottom section 11 and extending up to support the top section 12. When a child stands on the surface 14, the springs 24 will be somewhat compressed to operate a switch.

A switch 25 is shown schematically in FIG. 2. Those skilled in the art will understand that any of numerous arrangements may be used. A simple strip of metal can be bent when the top portion moves down, the strip acting as an electrical contact. There are numerous forms of microswitches having plungers or the like that can be moved by motion of the top section 12. Any such switch means can be used in the present invention with good results.

The lights 20 are also shown rather schematically. These can be incandescent bulbs, or light-emitting-diodes (LED's), or other form of electric lights. Each of the lights 20 has one side connected to a controller 26, and the other side connected to a common line 28. Such an arrangement will allow separate operation of each of the lights 20; however, if all lights are to be "on" and "off" simultaneously all the lights can be simply connected in parallel.

FIG. 2 also illustrates a speaker 29 for delivering sounds. The speaker 29 is shown connected to the controller 26, and the sound may be stored on a tape, or in electronics as is will known in the art.

The triggering device 21 is shown as connected to the controller 26. When a single controller is used, there will effectively be an AND gate, so that both the switch 25 and the triggering device 21 must be "closed" before the lights or sound will operate. If less sophisticated circuitry is used, the switch 25 and the triggering device 21 will be connected in series.

FIG. 3 of the drawings is an enlarged view of the triggering device 21, and it can be seen that the triggering device 21 comprises a two piece grid. One piece of the grid has arms 30 connected to a common bar 31, while the other has arms 32 connected to a common bar 34. By connecting one piece to the positive pole, and the other to the negative pole, any adjacent arms 30 and 32 can be connected, and the result is as if a switch were closed.

To cooperate with the device 21, the right shoe has shorting strips 35 as shown in FIG. 4 of the drawings. As here shown, the shorting strips 35 may be metal staples driven into the heel of the shoe 36.

It should now be understood by those skilled in the art that a child will put on shoes, then stand on the footprints 15 and 16. If the shoes are on correctly, the shorting strips 35 will engage two or more of the arms 30 and 32 to complete a circuit through the triggering device 21. The weight of the child on the surface 14 will have closed the switch 25, so the controller 26 will cause the lights 20 to light, and will cause the speaker 29 to emit sounds. If the shoes are on wrong, it will be understood that the shorting strips 35 will be on the footprint 15, and will not engage the triggering means 21. The controller 26 will therefore not be activated.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

What is claimed is:

1. A teaching device, for teaching a child to put on a pair of shoes properly, said teaching device comprising a platform, left and right footprints on said platform anatomically correct for teaching a child correct left and right orientation of feet and the corresponding left and right shoes to be worn, entertainment means operatively connected to said platform means, trigger means, at least partially juxtaposed on one of said footprints, complementary trigger means adapted to be place on one of said shoes corresponding to said trigger means on said footprint, and circuit means for activating said entertainment means when said complementary trigger means engages said trigger means.

2. A teaching device as claimed in claim 1, wherein said trigger means comprises an electric grid, and said complementary trigger means comprises a shorting bar for connecting elements of said grid.

3. A teaching device as claimed in claim 1, wherein said entertainment means comprises a plurality of lights.

4. A teaching device as claimed in claim 3, wherein said entertainment means further includes sound producing means.

5. A teaching device as claimed in claim 4, said platform being the surface of an enclosure having a bottom section and a telescoping top section, spring means for selectively holding said top section above said bottom section, and switch means being closable on downward movement of said top section.

* * * * *